Sept. 8, 1964 R. E. MILFORD 3,148,336
CURRENT AMPLIFIER PROVIDING SUM OF ABSOLUTE VALUES OF SIGNALS
Original Filed May 1, 1959
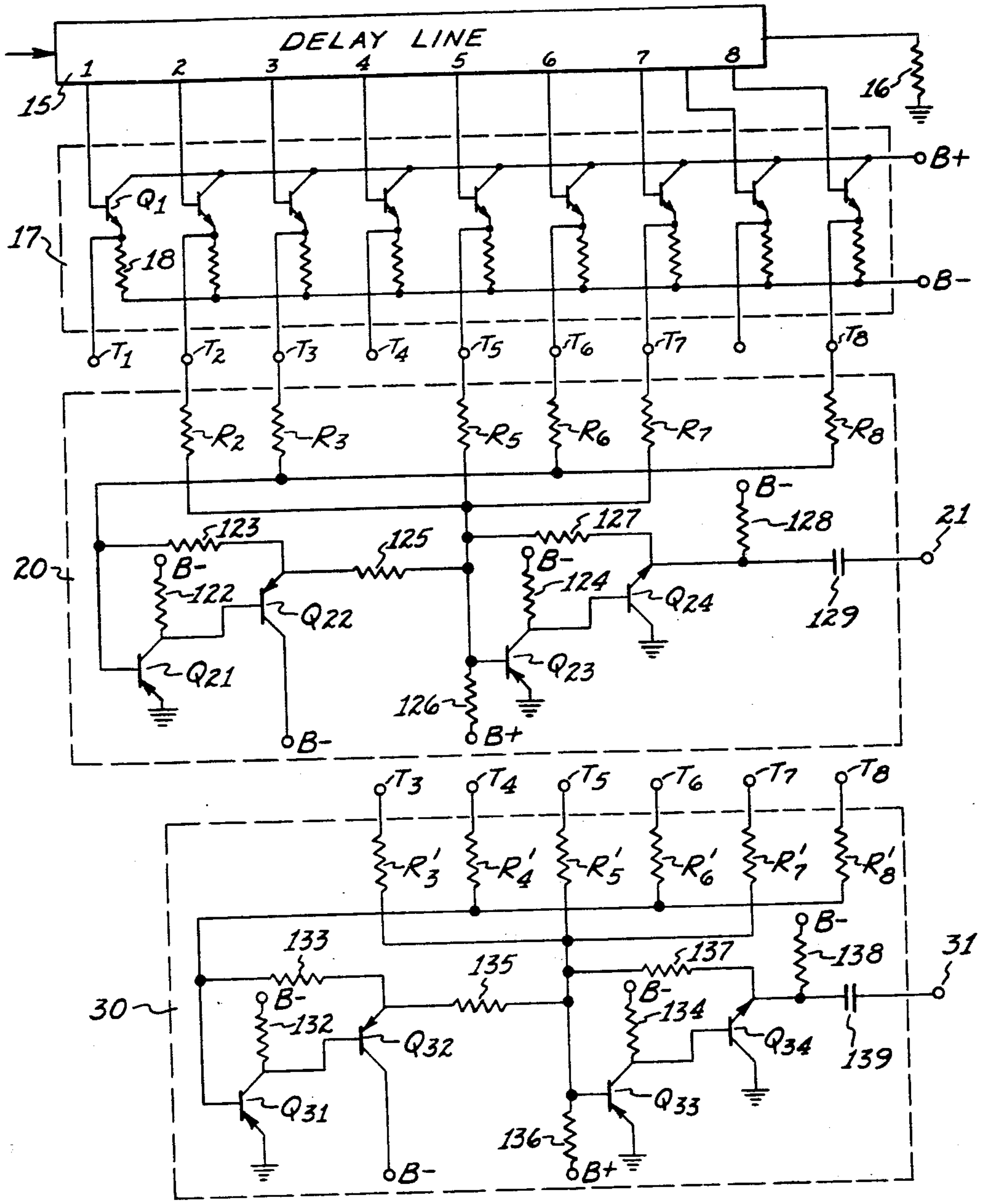
INVENTOR.
RICHARD E. MILFORD
BY A. M. Fernandez
ATTORNEY United States Patent Office 3,148,336 Patented Sept. 8, 1964

3,148,336
CURRENT AMPLIFIER PROVIDING SUM OF ABSOLUTE VALUES OF SIGNALS

Richard E. Milford, Glendale, Ariz., assignor to General Electric Company, a corporation of New York Original application May 1, 1959, Ser. No. 810,281, now Patent No. 3,111,645, dated Nov. 19, 1963. Divided and this application June 21, 1960, Ser. No. 37,630
4 Claims. (Cl. 330—19)

The present invention pertains to a new and improved direct current amplifier. More specifically, the present invention is concerned with a current summing amplifier employing transistors.

It is frequently necessary or desirable to obtain the sum of the absolute values of both positive and negative signals by employing a current summing amplifier circuit. An example of a current summing amplifier circuit employed for that purpose is described as part of a correlation network disclosed in a copending application for an improvement in a Waveform Recognition System, Serial No. 810,281, filed May 1, 1959, now Patent No. 3,111,645, issued November 19, 1963, of which the present application is a division. In an auto-correlation network disclosed thesein, a plurality of signals are applied to input terminals of a current summing amplifier circuit, each signal being either positive or negative with respect to a reference potential. All of the positive signals are coupled to a first amplifier input terminal and all of the negative signals are coupled to a second amplifier input terminal. The absolute sum of both positive and negative signals is obtained at an output terminal of the amplifier circuit.

The object of the present invention is to provide a novel current amplifier circuit which provides the sum of the absolute values of both positive and negative signals.

A further object is to provide an improved direct current amplifier.

These objects may be realized through the provision of a current summing amplifier circuit consisting of two direct current amplifiers connected in cascade and a plurality of impedance elements connecting signals of one polarity to the first of two direct current amplifiers and current signals of the other polarity to the second direct current amplifier. The first direct current amplifier combines or adds the signals applied to it and inverts the sum of those signals. The second direct current amplifier combines or adds the inverted sum or combination of signals from the first direct current amplifier with the input signals applied to it and inverts the sum of those signals to provide the absolute sum of the signals applied to the current summing amplifier circuit.

A circuit diagram of a summing amplifier circuit according to the present invention is disclosed in the sole figure. The circuit consists of a delay line 15 in which a waveform having several voltage peaks is stored as a traveling wave. The delay line is provided with eight equally spaced taps coupled to terminals T1 to T8 by an emitter-follower coupling circuit 17. When a waveform to be recognized is stored as a traveling wave such that its leading voltage peak appears at terminal T8, it is in what will hereafter be referred to as a reference position. Signals which appear at terminals T1 to T8 when a stored waveform is in its reference position are applied simultaneously to a correlation network 20 and a correlation network 30. Although only two correlation networks are shown for purposes of illustration, it should be understood that additional correlation networks may be added, each one designed for a given one of the additional unique waveforms that are to be recognized.

The correlation network 20 is designed to recognize a waveform derived by electromagnetically sensing a unique symbol printed with magnetic ink on a record bearing medium as more fully described in Patent No. 3,111,645. When signal samples of the traveling wave are applied to the correlation network 20, an output signal is obtained at a terminal 21 which reaches a maximum amplitude when the waveform is stored in its reference position. That maximum amplitude output signal at terminal 21 is referred to as an auto-correlation signal because its amplitude will be higher than the amplitude of any output signal from any other correlation network such as the correlation network 30, thereby indicating that the waveform is the unique waveform the correlation network 20 is designed to recognize.

The illustrated correlation circuits 20 and 30 include improvements made on an apparatus for waveform recognition employing correlation techniques as disclosed in U.S. Patent No. 2,924,812. All of those improvements are more fully described in the aforesaid Patent No. 3,111,645. For the purposes of the present application on a novel amplifier circuit, it is sufficient to appreciate that when a waveform to be recognized by its associated correlation circuit 20 is in the reference position, waveform signal samples present at the terminals T2, T3 and T5 to T6 are applied to input terminals of the correlation network 20. The signal samples at terminals T3, T6 and T8 which are positive with respect to a reference potential are coupled to the base electrode circuit of a PNP transistor $Q_{21}$ by resistors R3, R6 and R8 and the signal samples at terminals T2, T5 and T7 which are negative with respect to a reference are coupled to the base electrode of a PNP transistor $Q_{23}$ by resistors R2, R5 and R7. The terminals T1 and T4 are purposely not coupled to either transistor because the waveform signal samples present at those output terminals when the wave form to be recognized in its reference position are at a zero or reference potential.

Since waveform signal samples of the waveform to be recognized by the correlation network 20 are also applied to the correlation network 30, a signal is produced at an output terminal 31 which will also reach a maximum amplitude. That signal is referred to as a cross-correlation signal and may or may not reach a maximum amplitude at the time the auto-correlation signal reaches a maximum amplitude, but its maximum amplitude will always be less because it is obtained from a network designed to recognize a waveform which is different from the waveform which the correlation network 20 is designed to recognize. Accordingly, the correlation network 20 recognizes a given waveform by producing an auto-correlation signal at the output terminal 21 which is a signal having a greater voltage amplitude than a signal produced by any other network designed to recognized a different symbol waveform. In a similar manner, the correlation network 30 recognizes a second waveform by producing an auto-correlation signal at the output terminal 31 which is a signal having a greater voltage amplitude than a signal produced by any other network designed to recognize a waveform which is different from that to be recognized by the correlation network. 30.

In order to design each correlation network, such as the correlation network 20, to recognize a given waveform, its coupling resistors, such as the resistors R2, R3, R5, R6, R7 and R8 associated with the correlation network 20, are designed to multiply by predetermined constants the waveform sample signals present at corresponding output terminals, such as terminals T2, T3, T5, T6, T7 and T8, when the waveform to be recognized is stored in the delay line in its reference position. The particular factor by which each waveform signal sample is to be multiplied is introduced by designing its coupling resistor to have a resistance value which is inversely proportional to the particular multiplication factor. The manner in which each multiplication factor is determined is described in the aforesaid application.

The coupling resistors in the correlation network are not a part of the present invention except to the extent that each coupling resistor, such as the resistor R3 of the correlation network 20, is employed to couple a signal from an associated terminal T3 to the base electrode of the transistor $Q_{21}$. Whether or not the coupling resistors are designed to introduce a predetermined multiplication factor is immaterial to the operation of the present invention of a new and improved direct current amplifier circuit the operation of which will now be described.

Since the direct current amplifier circuit in the correlation network 30 is the same as the one in the correlation network 20, except for the resistance values of the coupling resistors and the terminals to which they are connected, only the one in the correlation network 20 will be described. It comprises three PNP transistors $Q_{21}$, $Q_{22}$ and $Q_{23}$ and an NPN transistor $Q_{24}$. Two current summing amplifiers actually exist in this circuit. The first includes transistors $Q_{21}$ and $Q_{22}$ while the second includes transistors $Q_{23}$ and $Q_{24}$.

In the first current summing amplifier, the transistor $Q_{21}$ is connected in a common-emitter amplifier configuration; the emitter is connected to a source of reference potential or ground and the collector is connected to a source of negative direct voltage through a resistor 122. Positive input signals are coupled to the base of transistor $Q_{21}$ in a manner described hereinbefore. Transistor $Q_{22}$ is connected in an emitter-follower configuration; the emitter is coupled to the base of transistor $Q_{21}$ by resistor 123 and the collector is connected to a source of negative direct voltage. The base of transistor $Q_{22}$ is connected to the collector of transistor $Q_{21}$. An output signal proportional to the sum of the several input signals coupled to the base of transistor $Q_{21}$ is obtained at the emitter of transistor $Q_{22}$.

In the second current summing amplifier, the transistor $Q_{23}$ is connected in a common-emitter amplifier configuration; the emitter is connected to the source of reference potential or ground and the collector is connected to a source of negative direct voltage through a resistor 124. The voltage signal obtained at the emitter of transistor $Q_{22}$ is coupled to the base of transistor $Q_{23}$ by a resistor 125. Other input current signals are coupled to the base of the transistor $Q_{23}$ in a manner described hereinbefore. The base of the transistor $Q_{23}$ is also connected to a source of positive direct voltage through a resistor 126 to prevent the transistor $Q_{23}$ from being driven to saturation during normal operation. The NPN transistor $Q_{24}$ is connected in an emitter-follower configuration; the emitter is connected to the base of transistor $Q_{23}$ through a feedback resistor 127 having a value of resistance equal to that of the coupling resistor 125 and to a source of negative direct voltage through resistor 128. An output signal proportional to the sum of the several input signals coupled to the base of transistor $Q_{23}$ is obtained at the emitter of transistor $Q_{24}$ and coupled to the output terminal 21 by a capacitor 129.

It is desirable that a load circuit connected to the output terminal 21 be driven to a maximum voltage as quickly as possible when a correlation signal is coupled by the capacitor 129 to the terminal 21. If there is capacitance in the load circuit, that capacitance must be charged before the load circuit may be driven to a voltage maximum. The response or charging time of that capacitance may be improved by providing a low impedance path for the charging current when a positive going correlation signal is coupled to terminal 21. To provide a low impedance path, an NPN type of transistor is employed in the output emitter-follower circuit which presents low impedance for charging current through the collector-to-emitter circuit of transistor $Q_{24}$; otherwise, the output emitter-follower transistor $Q_{24}$ could be of the PNP type and connected in a manner similar to the emitter-follower transistor $Q_{22}$.

In operation, positive signals at input terminals T3, T6 and T8 are added by the novel summing amplifier which consists of a common-emitter amplifier with a unique emitter-follower feedback circuit which couples collector output signal of the transistor $Q_{21}$ to its base electrode. Since the common-emitter amplifier introduces a multiplication factor substantially equal to $-1$, the sum of the positive current input signals into the base electrode of transistor $Q_{21}$ has a negative sign. The emitter-follower introduces a multiplication factor substantially equal to $+1$; therefore, the sum output signal coupled to the second summing amplifier by the resistor 125 also has a negative sign.

The resistance of the coupling resistor is substantially equal to the resistance of the feedback resistor 127 of the second amplifier circuit so that a multiplication factor substantially equal to $+1$ is introduced by it. All of the negative signals coupled to the base of the transistor $Q_{23}$ from terminals T2, T5 and T7 and from the first summing amplifier are summed and inverted to present a positive output signal which is the absolute sum of all of the signals coupled into both the first summing amplifier and the second summing amplifier.

While the priciples of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. In a summing amplifier circuit for obtaining the absolute sum of positive and negative current signals, the combination comprising: a first and second summing amplifier, each of said summing amplifiers consisting of a common-emitter connected transistor having a collector coupled to its base by an emitter-follower connected transistor, an emitter circuit load resistor of which is connected between said base of said common-emitter connected transistor and an emitter of said emitter-follower connected transistor; impedance means for coupling said current signals of one polarity to said base of said common-emitter connected transistor of said first summing amplifier; impedance means for coupling said current signals of another polarity to said base of said common-emitter connected transistor of said second summing amplifier; impedance means for coupling said second summing amplifier in cascade with said first summing amplifier; and means for coupling an output terminal to said emitter of said emitter-follower connected transistor of said second summing amplifier.

2. In a summing amplifier circuit for obtaining the absolute sum of positive and negative current signals, the combination comprising: first and second summing amplifiers, each of said summing amplifiers including an input common-emitter-connected transistor, an output emitter-follower-connected transistor, coupling means for connecting the base of said emitter-follower-connected transistor to the collector of said common-emitter-connected transistor, and a feedback circuit connected between the emitter of said emitter-follower-connected transistor and the base of said common-emitter-connected transistor; impedance means for coupling said current signals of one polarity to the base of said input common-emitter-connected transistor of said first summing amplifier; impedance means for coupling said current signals of another polarity to the base of said input common-emitter-connected transistor of said second summing amplifier; impedance means for coupling said second summing amplifier in cascade with said first summing amplifier; and means for coupling an output terminal to the emitter of said emitter-follower-connected transistor of said second amplifier.

3. A summing amplifier circuit comprising: a first and second summing amplifier, each of said summing amplifiers comprising a common-emitter connected transistor having a collector coupled to its base by an emitter-follower connected transistor, a load resistor comprising a part of said emitter-follower connected transistor connected between said base of said common-emitter connected transistor and an emitter of said emitter-follower connected transistor; means for coupling current signals of one polarity to said base of said common-emitter connected transistor of said first summing amplifier; means for coupling current signals of another polarity to said base of said common-emitter connected transistor of said second summing amplifier; means for coupling said second summing amplifier in cascade with said first summing amplifier; and means for coupling an output terminal to said emitter of said emitter-follower connected transistor of said second summing amplifier.

4. In a summing amplifier circuit for obtaining the absolute sum of positive and negative current signals, the combination comprising: a first and second summing amplifier, each of said summing amplifiers comprising a common-emitter connected transistor having a collector coupled to its base by an emitter-follower connected transistor, a load resistor comprising a part of said emitter-follower connected transistor connected between said base of said common-emitter connected transistor and an emitter of said emitter-follower connected transistor; resistance means for coupling said current signals of one polarity to said base of said common-emitter connected transistor of said first summing amplifier; resistance means for coupling said current signals of another polarity to said base of said common-emitter connected transistor of said second summing amplifier; resistance means for coupling said second summing amplifier in cascade with said first summing amplifier; and means for coupling an output terminal to said emitter of said emitter-follower connected transistor of said second summing amplifier.

References Cited in the file of this patent

UNITED STATES PATENTS

| | | |
|---|---|---|
| 2,847,519 | Aronson | Aug. 12, 1958 |
| 2,860,195 | Stanley | Nov. 11, 1958 |
| 2,945,186 | Barash | July 12, 1960 |
| 2,959,741 | Murray | Nov. 8, 1960 |

OTHER REFERENCES

Hochwald: "D.C. Operational Amplifier With Transistor Chopper," Electronics, April 24, 1959.